United States Patent [19]

Robertson

[11] 4,340,347
[45] Jul. 20, 1982

[54] SCRAP RECOVERY SYSTEM

[76] Inventor: Joseph D. Robertson, 990 Swathmore Dr., NW., Atlanta, Ga. 30327

[21] Appl. No.: 211,751

[22] Filed: Dec. 1, 1980

[51] Int. Cl.³ .............................................. B29F 3/02
[52] U.S. Cl. ....................................... 425/217; 222/1; 222/136; 264/37; 264/DIG. 69; 406/195; 425/182; 425/216; 425/DIG. 46
[58] Field of Search ............... 425/217, DIG. 46, 215, 425/216, 182; 222/1, 136, 145; 137/502; 264/37, DIG. 69; 406/195, 12

[56] References Cited

U.S. PATENT DOCUMENTS

| | | | |
|---|---|---|---|
| 2,829,664 | 4/1958 | Mountford | 137/502 |
| 2,925,117 | 2/1960 | Moore et al. | 425/217 |
| 2,995,775 | 8/1961 | Schnitzius et al. | 425/217 |
| 3,177,527 | 4/1965 | Nelson | 222/241 |
| 3,225,963 | 12/1965 | Arpajian | 222/1 |
| 3,643,688 | 2/1972 | Meinert | 222/136 |
| 3,797,702 | 3/1974 | Robertson | 222/1 |
| 3,941,318 | 3/1976 | Ballinger et al. | 425/217 |
| 4,014,462 | 3/1977 | Robertson | 222/136 |

*Primary Examiner*—Jeffery R. Thurlow
*Attorney, Agent, or Firm*—Jones & Askew

[57] ABSTRACT

Particulate plastic materials are moved from a supply hopper through a former and formed into a product, the product is cut, and the scrap from the cut product is moved from the cutting area back to the supply hopper by an open conduit pneumatic induction system. The induction system includes a blower and an approximately L-shaped induction conduit with its first leg receiving the exhaust of the blower and its second leg including a Venturi throat. An induction opening is formed in the induction conduit and a scrap feed nozzle is telescopically mounted in the induction opening and has its discharge movably supported in the Venturi throat. The scrap feed nozzle is adjustable with respect to the Venturi throat so as to adjust the system to the most energy efficient position for required operating conditions.

5 Claims, 2 Drawing Figures

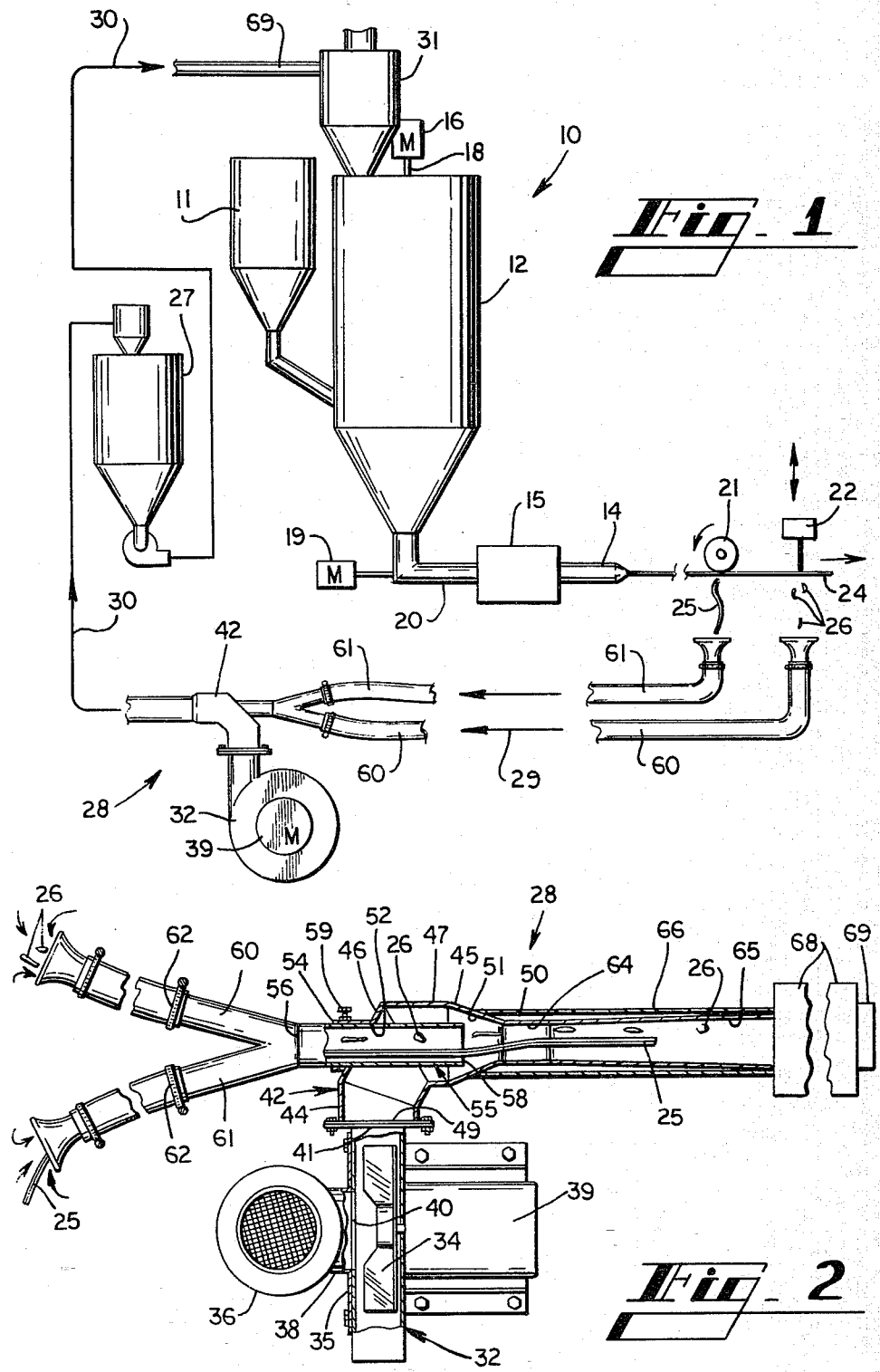

SCRAP RECOVERY SYSTEM

BACKGROUND OF THE INVENTION

This invention relates to a manufacturing process wherein particulate plastic materials are moved from a supply hopper through an extruder and formed into a product, the product is cut and the scrap from the cut product is moved progressively from the cutting means back to the supply hopper and blended with the virgin particulate materials. More particularly, this invention relates to a scrap recovery system in combination with a processing system for particulate plastic materials wherein the scrap is recovered from the manufacturing process with an adjustable vacuum-pressure airstream in which the scrap is induced to flow along an open conduit return circuit to a grinder and then to the supply hopper of the processing system.

In the manufacture of plastic sheet or film materials, such as polyethylene, polyvinylchloride, and polystyrene, both in dense form and foam form, the virgin particulate material is moved from a supply hopper through an extruder and extruded in the form of a bubble or cylindrical tube which is cooled as it progressively moves away from the extruder. The formed product can be treated in various ways to create the final product. For instance, the bubble can be slit along its length and spread out flat, the bubble can remain uncut along its length and spread flat in two plys and rolled into a reel, or the bubble can be flattened and its edges trimmed to form two or more separate sheets and the separate sheets can be accumulated in separate rolls.

The scrap material produced from trimming the formed plastic material either must be disposed of or recycled with the virgin or base particulate material. As disclosed in my prior art U.S. Pat. No. 3,797,702, it is desirable to recycle the scrap material since it is expensive to dispose of the scrap material, and the recycled scrap material reduces the amount of virgin material required for the manufacturing process. Additionally, it is desirable to progressively reclaim and recycle the scrap material so that the scrap material does not have to be accumulated at the manufacturing process and so as to provide a substantially uniform blend of scrap and base material in the manufacturing process.

Air induction systems have been known in the past as a means for conveying scrap plastic materials from a waste collection area back to a supply hopper; however, the prior art conveying systems have been unsuccessful in that once they have been installed they are difficult to modify in order to adjust to different plant conditions. For example, if the manufacturing process is changed to produce a more dense product, or if the scrap is larger in size, or if the scrap must be conveyed longer distances, the existing air induction scrap recycling system is likely to function with less efficiency or might have to be replaced. Moreover, there seems to be no uniform arrangement for the various processing systems in that the type and volume of scrap to be recycled and the distance from area where the scrap is created back to the supply hopper varies from one plant to the next. Therefore, no standard induction system has been developed for all manufacturing apparatus which uses only the minimum amount of energy in the recycling system.

An open conduit induction system is especially desirable when recycling the scrap plastic material in a manufacturing process because some of the scrap material may be long strips or other irregular size and the open conduit induction system can move the material without requiring the material to pass through any moving parts of a blower, etc. Usually, the exhaust of a blower is moved through a Venturi nozzle and an induction tube extends from the vacuum side of the Venturi nozzle to the scrap receiving area so that the vacuum created in the conduit is used to induce a flow of air and scrap from the scrap receiving area to the Venturi, and then the high pressure air from the blower moves the air and scrap on through the conduit system back to the supply hopper. While this system is successful, the Venturi devices utilized in the past have had a fixed relationship between the induction conduit and the Venturi throat so that changes could not be made to accommodate materials of different characteristics and different plant conditions.

SUMMARY OF THE INVENTION

Briefly described, the present invention comprises a scrap recovery system in combination with a processing system for plastic materials, wherein the scrap produced in the processing system is continuously recovered and moved by a variable flow open conduit induction system back to the grinder and then to the supply hopper of the processing system, wherein the induction system includes an adjustable Venturi nozzle assembly which can be adjusted to accommodate scrap material which varies in size and density, and which can be adjusted to be compatible with various plant conditions such as varying distances between the scrap recovery area and the supply hopper. The induction system includes a blower with an exhaust outlet and a curved approximately L-shaped induction conduit having its air inlet opening in one leg and its outlet opening in the other leg and with a Venturi throat of progressively reduced cross-sectional area positioned adjacent the outlet opening of the other leg. An induction opening is formed in the convex surface of the curved approximately L-shaped induction conduit, and a mounting socket is formed about the induction opening and is aligned with the Venturi throat. An adjustable feed nozzle is telescopically mounted in the mounting socket with its discharge openings movably positioned in the Venturi throat.

Thus, it is an object of this invention to provide a scrap recovery apparatus for a processing system in which scrap is recovered in a recovery area from the cut product of the processing system and is moved by an induction conveyor progressively back to the supply hopper of the processing system, and wherein the induction conveyor includes an adjustable Venturi nozzle assembly for accommodating scrap of varying size and density and for adjusting to the flow requirements of the processing system, to carry the scrap from the recovery area toward the supply hopper of the processing system.

Another object of this invention is to provide an adjustable Venturi induction flow system for use in combination with a plastic processing system for recycling the scrap from a scrap collection area back to the supply hopper of the processing system.

Another object of this invention is to provide an adjustable induction flow system which is compatible with various plastic processing systems to recycle scrap from a recovery area to a supply hopper at various distances from the recovery area and which functions to recycle scrap of varying size and density.

Other objects, features and advantages of the present invention will become apparent upon reading the following specification, when taken in conjunction with accompanying drawings.

BRIEF DESCRIPTION OF THE DRAWINGS

FIG. 1 is a schematic illustration of the processing system, illustrating the scrap recovery system in combination therewith.

FIG. 2 is a cross-sectional view of a portion of the scrap recovery system, with parts removed for clarity.

DETAILED DESCRIPTION

Referring now in more detail to the drawings, in which like numerals indicate like parts throughout both views, FIG. 1 schematically illustrates a processing system 10 that includes a virgin pellet supply hopper 11, a scrap receiving hopper 12, an extruder nozzle 14, heater 15, scrap auger motor 16, the upper portion of internal auger drive shaft 18, auger motor 19 and extruder conduit 20. The internal components of scrap receiving hopper 12 are shown in more detail in my prior U.S. Pat. No. 3,797,702. Cutting means 21 and 22 are schematically illustrated for cutting the formed product 24 and creating the scrap 25 and 26. The scrap 25 and 26 falls into a collection area adjacent cutting means 21 and 22 and pneumatic conveying means 28 induces a flow of air from the receiving area as indicated by arrows 29 and 30 back to a separator 31 above scrap receiving hopper 12. If desired, the pneumatic conveying means 28 can move the scrap to a grinder 27 so that the scrap can be reduced in size prior to being received in the scrap receiving hopper 12.

As illustrated in more detail in FIG. 2, pneumatic conveying means 28 comprises centrifugal blower 32 that includes a rotatable impeller 34, blower housing 35, inlet silencer assembly 36, inlet conduit 38, and motor 39 connected to impeller 34. When the impeller 34 is rotated by motor 39, the blower 32 functions in a conventional manner to induce a stream of air through silencer 36 and conduit 38 to the inlet opening 40 of blower housing 35, and then radially outwardly of blower housing 35 through exhaust opening 41.

Induction conduit 42 is approximately L-shaped and includes a first or inlet conduit section 44 and a second or outlet conduit section 45 with intermediate conduit sections 46 and 47. Inlet conduit section 44 includes inlet opening 49 which registers with the exhaust opening 41 of blower 32, while outlet conduit section 45 includes outlet outlet opening 50. Outlet conduit section 45 is of progressively reduced cross-sectional area, approximately cone-shaped to form a Venturi throat 51 adjacent outlet opening 50.

Intermediate conduit section 46 of induction conduit 42 includes induction opening 52 which is aligned with outlet opening 50 of the induction conduit. Mounting socket 54 is rigidly mounted to intermediate conduit section 46 about induction opening 52, and mounting socket 54 is also aligned with outlet opening 50 of induction conduit 42.

Induction nozzle 55 is telescopically received in mounting socket 54 and includes an inlet opening at 56 located outside induction conduit 42 and a discharge opening 58 located within induction conduit 42 in the vicinity of outlet conduit section 45 which comprises the Venturi throat 51. Set screws 59 extend through mounting socket 54 and frictionally engage induction nozzle 55 to hold the nozzle in a fixed position with respect to Venturi throat 51. Branch conduits 60 and 61 merge together and are connected to induction nozzle 55 at its inlet opening 56. Clamps or other support means 62 are used to support branch conduit 60 adjacent induction nozzle 55.

Converging Venturi throat 51 is connected to cylindrical Venturi throat 64, and cylindrical Venturi throat 64 is connected to diverging Venturi throat 65, and the Venturi throats 51, 64 and 65 are substantially surrounded by support sleeve 66. A silencer 68 can be used at the end of diverging Venturi throat 65, if desired.

OPERATION

When the processing system of FIG. 1 is in operation, the auger 18 blends scrap from scrap receiving hopper 12 with the virgin pellet material from virgin pellet supply hopper 11 and the blend is carried to extruder conduit 20. The extruder auger driven by motor 19 moves the blend of materials through heater 15 and through the extruder nozzle 14, whereupon the hot plastic material is extruded and formed into a product 24. The product is cooled and cured, and then cut by cutting means such as 21 and 22. The scrap is received in the receiving area at the cutting means and is induced to move into the branch conduits 60 and 61 by a stream of air moving through the conduits. The scrap 25 and 26 can be of different size, shapes and densities. For example, scrap 25 is illustrated as being a continuous strip of material while scrap 26 is illustrated as being smaller particles of material.

The blower 32 of the pneumatic conveying means 28 moves a stream of air into the approximately L-shaped induction conduit 42, and the conduit 42 turns the air through an approximately 90° angle and discharges the air into the converging Venturi throat 51, then through the cylindrical throat 64, and finally through the diverging throat 65. The air accelerates as it moves through the progressively reduced cross-sectional area of the converging Venturi throat section 51. This induces air movement through induction nozzle 55 and the air thus is induced to move through branch conduits 60 and 61 at a pressure less than atmospheric pressure, so as to move the scrap materials 25 and 26 through the branch conduits 60 and 61. When the scrap materials 25 and 26 reach the discharge opening 58 of induction nozzle 55, the primary air from blower 32 propels the air and scrap on through the Venturi throat, whereupon the air moves at a positive pressure on through the scrap return conduit 68 back toward the scrap receiving hopper 69. If a grinder is used in the system, the scrap moves to the grinder 27 where it is subdivided into smaller particles, and the blower at the outlet of the grinder moves the scrap on to the upper inlet of the scrap receiving hopper.

When the pneumatic conveying means 28 is initially assembled and connected between the scrap receiving area at the cutting means 21 and 22 and the scrap receiving hopper 12, the most energy efficient arrangement can be provided by adjusting induction nozzle 55 so that its discharge opening 58 is located at a position within induction conduit 42 to provide the minimum induced air velocity required to adequately move the scrap into Venturi throat 51, thus requiring the minimum energy input by blower motor 39. The induced velocity is influenced by the negative back pressure from conduits 60 and 61 to induction nozzle 55, the positive head pressure from scrap return conduit 69 back to Venturi 51, and the volume and weight of the scrap material being moved through the system. Also, it is important that the volume of air used to move the scrap material is held to a minimum to minimize the problems of separating the scrap from the air at the air separator of grinder 27 or at the air separator 31 of the scrap hopper 12.

Ideally, the scrap will move continuously from the scrap receiving area at cutters 21 and 22 through the open conduit induction system to scrap hopper 12; however, the open conduit system is capable of moving intermittent surges of the scrap material to the scrap hopper and the scrap is not required to move through or between any moving elements such as the movable blades of a blower, etc. The scrap hopper 12 functions as an accumulation chamber so that when surges of scrap are received from the induction system or when no scrap is received from the induction system the scrap already present in the scrap hopper continues to be blended at a substantially uniform rate with the virgin pellets from hopper 11.

While this invention has been described in specific detail with particular reference to a preferred embodiment thereof, it will be understood that variations and modifications can be effected within the spirit and scope of the invention as described hereinbefore and as defined in the appended claims.

I claim:

1. A scrap recovery apparatus for a processing system in which particulate plastic materials are moved from a supply hopper through a former and formed into a product, cutting means cuts the formed product, and the scrap from the cut product is moved progressively from the cutting means back to the supply hopper, the improvement therein of pneumatic conveying means including a blower having an exhaust opening, an approximately L-shaped induction conduit with a first leg including an induction air inlet in communication with said blower exhaust opening, a second leg angled with respect to said first leg and defining an outlet opening and formed with a section of progressively reduced cross-sectional area at its outlet opening, a third opening positioned generally between the inlet opening of said first leg and the outlet opening of said second leg, an adjustable feed nozzle extending through said third opening and defining an inlet opening outside said induction conduit and a discharge nozzle opening in said induction conduit aligned with the outlet opening of said induction conduit, said feed nozzle defining a rectilinear cylindrical passageway extending therethrough for the movement of scrap in a straight path from outside said induction conduit, through said feed nozzle and into the second leg of said induction conduit, means for adjustably positioning the discharge opening of said feed nozzle to locate the discharge opening further into or out of the section of progressively reduced cross-sectional area of said induction conduit, whereby air from the blower is moved through the first leg of the induction conduit, then about the feed nozzle and through the second leg of the induction conduit and through the progressively reduced cross-sectional area of the outlet opening of the induction conduit to induce a flow of air and scrap in a straight path from outside the induction conduit and on through the feed nozzle and the second leg of the induction conduit, for directing scrap from said cutting means to said induction conduit and directing scrap from the induction conduit to the supply hopper of the processing system.

2. The invention of claim 1 and wherein said means for adjustably positioning said adjustable feed nozzle comprises means for accomodating telescopic movement of said feed nozzle with respect to the section of progressively reduced cross-sectional area of said induction conduit.

3. The invention of claim 1 and wherein the third opening of said induction conduit is aligned with the outlet opening of said induction nozzle, and further including a mounting socket surrounding said third opening, said mounting socket being aligned with the outlet opening of said induction conduit, and said adjustable feed nozzle being telescopically mounted in said mounting socket.

4. A scrap recovery apparatus for a processing system in which particulate materials are moved from a supply hopper through a former and formed into a product and cutting means cuts the formed product, and the scrap from the cut product is moved progressively from the cutting means back to the supply hopper, the improvement therein of pneumatic conveying means including a blower having an exhaust opening and an induction conduit having an air inlet opening in communication with the exhaust opening of said blower for receiving the exhaust of said blower and an outlet opening for discharging the exhaust of said blower, said induction conduit including a section of reduced cross-sectional area adjacent its outlet opening to form a nozzle, said induction conduit including an induction opening, a scrap feed nozzle telescopically mounted in said induction opening and defining a rectilinear passageway extending therethrough from outside said induction opening with an inlet opening outside said induction conduit and a discharge opening in said induction conduit aligned with the outlet opening of said induction conduit and movable in said section of reduced cross-sectional area toward and away from the outlet opening of said induction conduit, for directing scrap from the cutting means of the processing system to the induction conduit, and directing scrap to the supply hopper of the processing system.

5. The scrap recovery apparatus of claim 4 and wherein said induction opening includes an axially aligned mounting socket, said scrap feed nozzle extending through said mounting socket, and set screws releasably locking said scrap feed nozzle in said mounting socket.

* * * * *